(12) United States Patent
De Filippis et al.

(10) Patent No.: US 7,388,347 B2
(45) Date of Patent: Jun. 17, 2008

(54) METHOD AND INVERTER FOR CONTROLLING A DIRECT CURRENT MOTOR

(75) Inventors: Pietro De Filippis, Milan (IT); Ralf Hochhausen, Ingolstadt (DE); Jörg Seyfarth, Regensburg (DE)

(73) Assignee: BSH Bosch und Siemens Hausgeraete GmbH, Munich (DE)

( * ) Notice: Subject to any disclaimer, the term of this patent is extended or adjusted under 35 U.S.C. 154(b) by 0 days.

(21) Appl. No.: 10/582,506

(22) PCT Filed: Dec. 8, 2004

(86) PCT No.: PCT/EP2004/053355

§ 371 (c)(1),
(2), (4) Date: Feb. 21, 2007

(87) PCT Pub. No.: WO2005/060086

PCT Pub. Date: Jun. 30, 2005

(65) Prior Publication Data

US 2007/0138983 A1    Jun. 21, 2007

(30) Foreign Application Priority Data

Dec. 9, 2003    (DE) ................................ 103 57 503

(51) Int. Cl.
*H03D 13/00* (2006.01)
(52) U.S. Cl. ........................ 318/812; 318/809; 318/813; 318/814; 318/820
(58) Field of Classification Search .................. 388/812, 388/809, 813, 814, 820
See application file for complete search history.

(56) References Cited

U.S. PATENT DOCUMENTS

| | | | | |
|---|---|---|---|---|
| 4,259,620 A | * | 3/1981 | Oates et al. .................. | 318/802 |
| 4,449,086 A | * | 5/1984 | Hoffmann et al. ........... | 318/696 |
| 4,484,123 A | * | 11/1984 | Raducanu .................... | 318/696 |
| 4,973,896 A | * | 11/1990 | Shiga et al. ................... | 322/28 |
| 5,105,141 A | * | 4/1992 | Ernest ........................ | 318/805 |
| 5,111,091 A | * | 5/1992 | Bahn ........................ | 310/68 B |
| 5,123,080 A | * | 6/1992 | Gillett et al. ................. | 388/811 |
| 5,483,140 A | * | 1/1996 | Hess et al. .................. | 318/802 |
| 5,760,359 A | * | 6/1998 | Nakano et al. ............... | 318/603 |
| 6,121,736 A | * | 9/2000 | Narazaki et al. ............ | 318/254 |
| 6,570,353 B2 | | 5/2003 | Krotsch et al. .............. | 318/439 |
| 6,690,593 B2 | * | 2/2004 | Kimura et al. ................ | 363/98 |

FOREIGN PATENT DOCUMENTS

| | | |
|---|---|---|
| DE | 100 23 370 A1 | 11/2001 |
| EP | 0 128 796 A1 | 12/1984 |
| JP | 61-139296 | 6/1986 |

\* cited by examiner

*Primary Examiner*—Rita Leykin
(74) *Attorney, Agent, or Firm*—Laurence A. Greenberg; Werner H. Stemer; Ralph E. Locher

(57) ABSTRACT

A three-phase direct-current motor is controlled by cyclically repeating three first switching states. In each of the three first switching states, one of the three phases of the direct-current motor is periodically switched over between a first and a second input voltage, whereas the two other phases are continuously connected to the first input voltage.

8 Claims, 3 Drawing Sheets

METHOD AND INVERTER FOR CONTROLLING A DIRECT CURRENT MOTOR

BACKGROUND OF THE INVENTION

Field of the Invention

The present invention relates to a method for controlling a brushless direct-current motor and an AC/DC inverter suitable for carrying out the method.

The stator of such a motor generates a rotating magnetic field in which the magnets of the rotor attempt to align themselves and thereby drive a rotation of the rotor. In order to achieve the highest possible electrical efficiency of such a motor, it would be desirable to act upon three windings of the stator with sinusoidal currents, each phase-shifted by a third of a period with respect to one another. Since the rotational speed of the motor depends on the frequency of the currents, it must be possible to provide these currents with variable frequencies. In order to provide driving currents with arbitrarily selectable frequency, AC/DC inverters are usually used, which act upon the windings of the motor in pulsed mode with a fixed supply voltage, where the repetition frequency of the switch is substantially higher than the rotational frequency. The better a sinusoidal profile of the supply voltage is to be approximated with this type of AC/DC inverter, the higher the required frequency of the switching processes in the switches of the AC/DC inverter. The power loss of the switches increases with the switching frequency. If the switching frequency is too high, this can therefore result in overheating and destruction of the switch. The attainable efficiency of the motor is a compromise between the desire for sinusoidal supply currents for the motor windings on the one hand and the need for a low switching frequency and corresponding low losses in the AC/DC inverter on the other hand.

A widely used control method uses six periodically alternating switching states each having a duration of one sixth of a period wherein each winding is currentless respectively during one state, then current flows in a first direction for two states, then the winding is currentless for another state and finally current flows in the opposite direction for two further states and the currents of the three windings are each phase-shifted by a third of a period. This scheme is simple to control but one of the three windings of the motor is continuously currentless so that this does not contribute to forming the torque of the motor. The winding and the strengths of the currents flowing therein must therefore be designed so that the two windings through which current flows are sufficient to deliver a required torque. A control method whereby current could flow through all three windings at all times would allow the number of turns of the windings to be reduced for the same torque and thereby save not only costs, weight and size but also reduce ohmic losses and improve the efficiency.

SUMMARY OF THE INVENTION

It is the object of the invention to provide such an improved control method.

The object is achieved by a method for controlling a three-phase direct-current motor wherein three first switching states are cyclically repeated, wherein in each of the first three switching states one other of the three phases is periodically switched over between a first and a second input voltage whereas the two other phases are continuously connected to the first input voltage. Whilst one phase is connected to the second input voltage, a current flows in each case in a series circuit through this one phase and the two other phases parallel to one another so that all three phases carry current and contribute to the torque of the motor.

Uniform running of the motor is achieved if respectively one second switching state is inserted between two first switching states, in which one of the three phases is periodically switched over between the first and the second input voltage whereas the two other phases are continuously connected to the second input voltage. Here also, current flows through all three phases if one phase is switched to the first input voltage.

A continuously concentrically running space vector is obtained if in every second switching state that phase is periodically switched over which is periodically switched over neither in the preceding nor in the following first switching state.

For a uniform motor power it is further desirable that the fraction of the time in which, in every first switching state, the periodically switched-over phase is connected to the second input voltage from the duration of this first switching state is equal to the fraction of the time in which the periodically switched-over phase is connected to the first input voltage from the duration of each second switching state.

This time fraction is appropriately regulated in every first and/or second switching state proportionally to the load of the direct-current motor.

If an AC/DC inverter is used for controlling the direct-current motor, which for each phase of the motor, has a first switch placed between a terminal carrying the first input voltage and the relevant motor phase and a second switch placed between the relevant motor phase and a second terminal carrying the second input voltage, in every first switching state, the first switch of the periodically switched-over phase can remain open whilst the second switch of this phase is periodically switched over. Thus, no switching losses occur in the first switch. Accordingly, in every second switching state, the second switch of the periodically switched-over phase can remain open whilst the first switch of this phase is periodically switched over.

An AC/DC inverter according to the invention is fitted with a control circuit for controlling its switches according to a method as defined above.

Further features and advantages of the invention are obtained from the following description of exemplary embodiments with reference to the appended figures. In the figures:

DESCRIPTION OF THE PREFERRED EMBODIMENTS

Figure 1:
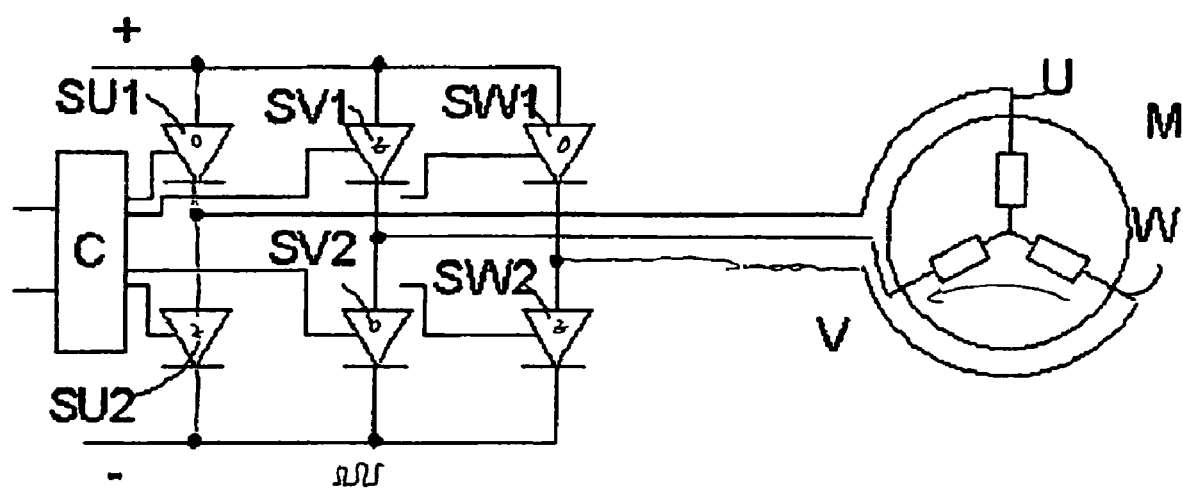
FIG. 1 is a block diagram of an AC/DC inverter which can be used to carry out the present invention.

The AC/DC inverter shown in FIG. 1 comprises six switches SU1, SV1, SW1, SU2, SV2, SW2 of which the switches SU1, SV1, SW1 are in each case arranged between a positive supply terminal (+) and a phase U, V or W of a three-phase brushless direct-current motor M and the switches SU2, SV2, SW2 are each arranged between one of these three phases and a negative supply terminal (−). The switches can be IGBTs with a suppressor diode connected in parallel in a manner known per se.

A control circuit C generates control sequences for opening and closing the switches SU1 to SW2 depending on two input signals which designate a desired rotational frequency of the magnetic field in the direct-current motor M or a desired power of the motor.

Figure 2:
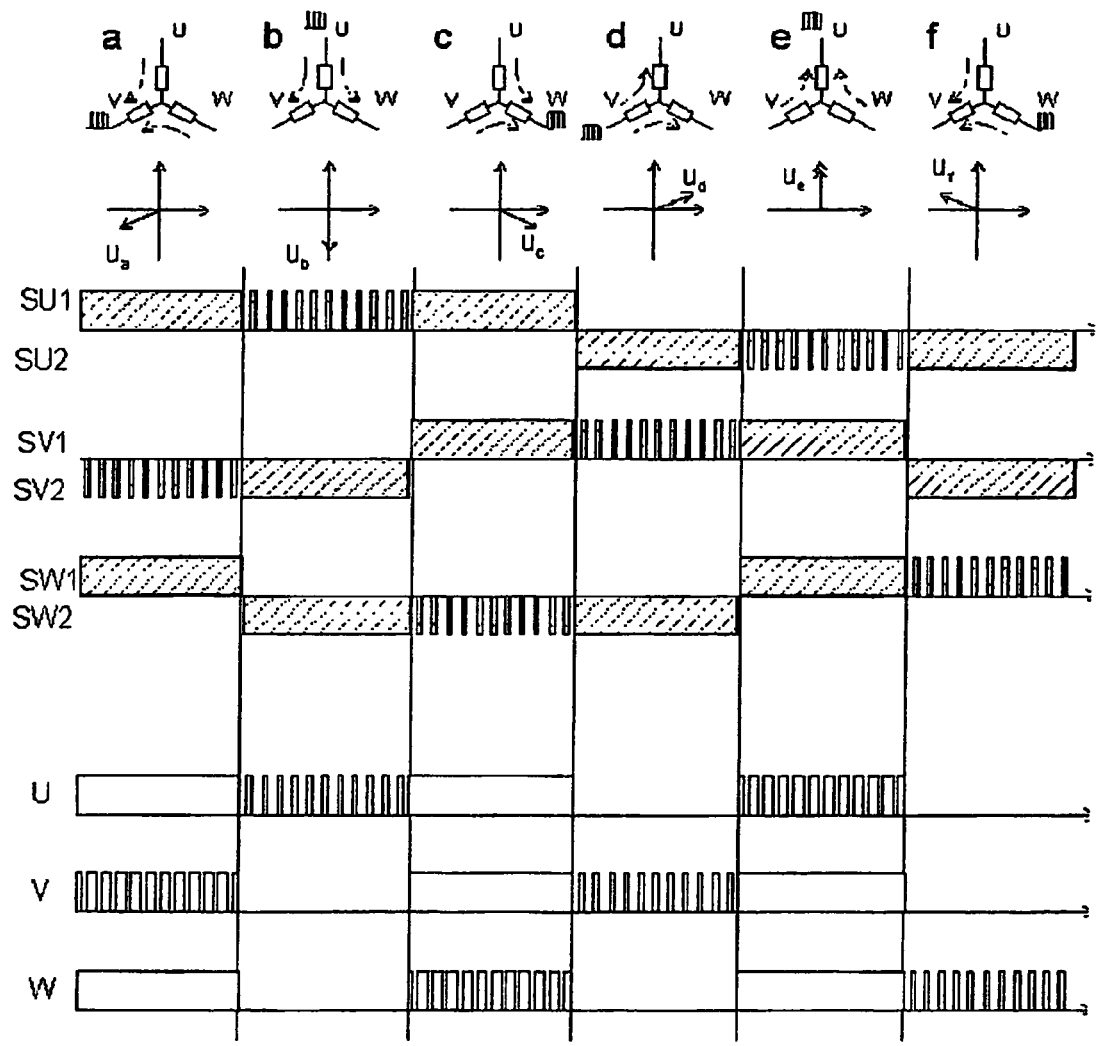
FIG. 2 is a time diagram illustrating the states of the switches of the AC/DC inverter as well as the voltages and current flow directions in the phases of the motor for the various states of the method according to the invention.

The control circuit C cyclically repeats a sequence of six switching states. In the first switching state, designated as a in FIG. 2, the switches SU1, SW1 connected to the positive terminal are closed and the respectively complementary switches SU2, SW2 are open so that the positive supply potential is applied to the phases U, W. The switch SV1 is likewise open and the switch SV2 is alternately opened and closed, the fraction $\alpha$ of the time in which the switch SV2 is closed from the duration of the first switching state a being selected by the control circuit C proportional to the required power of the motor M. As shown by the arrows in the schematic diagram of the motor in state a, current flows on the one hand through the phases U, V and W, V of the motor. All three phases therefore contribute to the space vector $U_a$ of the magnetic field, the contributions of the phases U,V being superposed to a contribution parallel to that of the phase V.

In the following switching state b the switch SU1 is closed with the pulse duty factor $\alpha$, the switches SV2 and SW2 are open and the switches SU2, SV1, SW1 are open. The phases V, W lie at the low supply voltage and the phase U acquires the high supply potential with the pulse duty factor $\alpha$. The space vector $U_b$ is turned through 60° in the anticlockwise direction.

In general, in the switching states a, c, e respectively in two phases, the switches connecting to the high supply potential are open and the switches connecting to the low supply potential are closed and in the third phase, the switch connecting to the high supply potential is open and that connecting to the low supply potential is pulsed. There are two different possibilities for a sequence of these three switching states a, c and e; these correspond to the two opposite directions of rotation of the motor. In each interposed switching state b, d or f, in respectively two of the phases U, V, W the switches connecting to the low supply potential are open and those connecting to the high supply potential are open and in the third phase, the switch connecting to the low supply potential is open and that connecting to the high supply potential is pulsed. The pulsed phase is in each case that phase which is pulsed neither in the directly preceding nor in the directly following switching state. Thus, a uniform rotation of the space vector of 60° is obtained from one switching state to the next.

Figure 3:
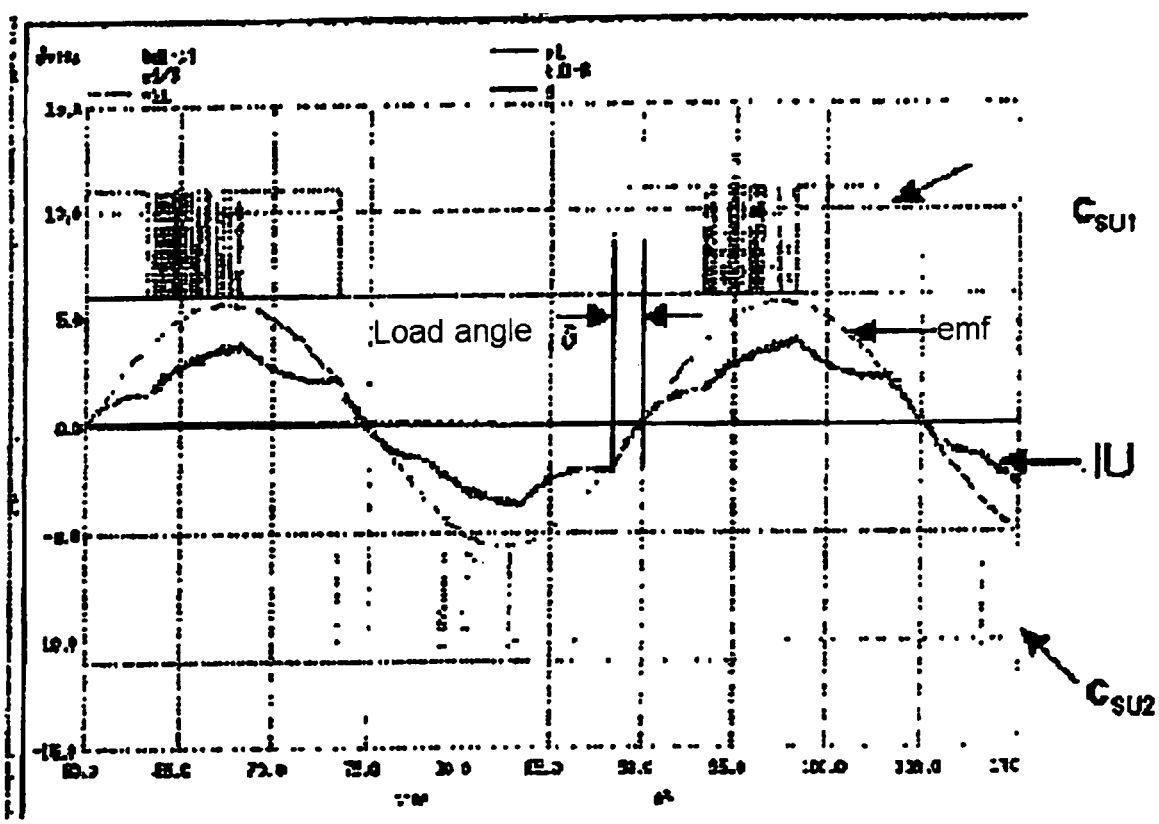
FIG. 3 is the simulated time profile of the current signal of one phase of an electric motor controlled according to the invention.

For one phase of the motor, for example, phase U, FIG. 3 shows the result of a calculated simulation of the phase current as a function of time plotted as curve IU together with control signals $c_{SU1}$ and $c_{SU2}$ for the two switches SU1, SU2 supplying the phase U at a load angle δ between the phase of the control signal $c_{SU1}$ and the electromotive force emf of the motor.

We claim:

1. A method for controlling a three-phase direct-current motor by way of a converter, which comprises:
cyclically repeating a sequence of six switching states of the converter, and thereby:
periodically switching over one of the three phases of the direct-current motor between a first and a second input voltage in each of the first three switching states, and keeping the remaining two phases continuously connected to the first input voltage;
inserting one second switching state respectively between two first switching states, the second switching state periodically switching over one of the three phases between the first and the second input voltage, and keeping the remaining two phases continuously connected to the second input voltage.

2. The method according to claim 1, which comprises, in every second switching state, periodically switching over that phase which is periodically switched over neither in a preceding nor in a following first switching state.

3. The method according to claim 1, wherein a fraction of the time in which the periodically switched-over phase is connected to the second input voltage from the duration of each first switching state is equal to a fraction of the time in which the periodically switched-over phase is connected to the first input voltage from the duration of each second switching state.

4. The method according to claim 1, which comprises, in each second switching state, regulating a fraction of the time in which the periodically switched-over phase is connected to the first input voltage proportionally to a load on the direct-current motor.

5. The method according to claim 1, which comprises, in each first switching state, regulating a fraction of the time in which the periodically switched-over phase is connected to the second input voltage proportionally to a load on the direct-current motor.

6. The method according to claim 1, which comprises connecting an AC/DC inverter for controlling the direct-current motor, between each phase of the motor and a terminal carrying the first input voltage, respectively one first switch of the AC/DC inverter is provided and between each phase of the motor and a terminal carrying the second input voltage, respectively one second switch of the AC/DC inverter is provided, and in every first switching state, the first switch of the periodically switched-over phase remains open while the second switch of the phase is periodically switched over.

7. The method according to claim 6, which comprises, in every second switching state, maintaining the second switch of the periodically switched-over phase open, while the first switch of the phase is periodically switched over.

8. An AC/DC inverter, comprising a control circuit for carrying out the method according to claim 1.

* * * * *